US012070962B2

(12) United States Patent
Tokura

(10) Patent No.: US 12,070,962 B2
(45) Date of Patent: Aug. 27, 2024

(54) INDIRECT TRANSFER PRINTER AND CONVEYANCE METHOD OF INDIRECT

(71) Applicant: TOPPAN INC., Tokyo (JP)

(72) Inventor: Masahiro Tokura, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/438,282

(22) Filed: Feb. 9, 2024

(65) Prior Publication Data

US 2024/0174015 A1 May 30, 2024

Related U.S. Application Data

(63) Continuation of application No. PCT/JP2022/030161, filed on Aug. 5, 2022.

(30) Foreign Application Priority Data

Aug. 18, 2021 (JP) ................................ 2021-133318

(51) Int. Cl.
*B41J 35/36* (2006.01)
*B41J 33/54* (2006.01)

(52) U.S. Cl.
CPC ............... *B41J 35/36* (2013.01); *B41J 33/54* (2013.01); *B41J 2203/01* (2020.08)

(58) Field of Classification Search
CPC ......... B41J 35/36; B41J 33/54; B41J 2203/01
See application file for complete search history.

(56) References Cited

U.S. PATENT DOCUMENTS

2001/0022661 A1* 9/2001 Fujimoto ................. B41J 33/14 358/1.8
2005/0174421 A1 8/2005 Connor et al.

FOREIGN PATENT DOCUMENTS

JP H08-188307 A 7/1996
JP 2002-103655 A 4/2002
JP 2015-013468 A 1/2015
JP 2015-221524 A 12/2015
JP 2019-209627 A 12/2019
(Continued)

OTHER PUBLICATIONS

International Searching Authority, "International Search Report," issued in connection with International Patent Application No. PCT/JP2022/030161, dated Sep. 13, 2022.
(Continued)

*Primary Examiner* — Justin Seo
(74) *Attorney, Agent, or Firm* — Foley & Lardner LLP

(57) ABSTRACT

At an initializing operation, if it is determined that an indirect transfer film has not been replaced before power-on if transferred sensor marks are detected while being conveyed from a supply spool to a winding spool, then the unused amount of the indirect transfer film is estimated on the ratio between the rotation angle of the supply spool and the rotation angle of the winding spool, if the unused amount is estimated to be 2% remaining amount alert threshold or more, positioning of the primary transfer is performed based on the last sensor mark among the sensor marks, and if estimated to be less than 2% it is determined that the unused amount is greater than an amount necessary for recording on the next recording medium unless an end mark is detected while the indirect transfer film is conveyed by predetermined image areas from the last sensor mark.

5 Claims, 6 Drawing Sheets

(56) References Cited

FOREIGN PATENT DOCUMENTS

| | | | |
|---|---|---|---|
| JP | 2020-066204 | A | 4/2020 |
| JP | 2020-089979 | A | 6/2020 |

OTHER PUBLICATIONS

International Searching Authority, "Written Opinion," issued in connection with International Patent Application No. PCT/JP2022/030161, dated Sep. 13, 2022.

* cited by examiner

INDIRECT TRANSFER PRINTER AND CONVEYANCE METHOD OF INDIRECT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/030161, filed on Aug. 5, 2022, which is based upon and claims the benefit of priority to Japanese Patent Application No. 2021-133318, filed on Aug. 18, 2021, the disclosures of which are incorporated herein by reference in their entirety.

TECHNICAL FIELD

The present invention relates to an indirect transfer printer and a conveyance method of an indirect transfer film, and more specifically, to an indirect transfer printer and a conveyance method of an indirect transfer film that improve efficiency of a printing process efficient by eliminating unnecessary film conveyance and suppress skew from occurring during conveyance of the film.

BACKGROUND

Indirect transfer printers are printers that primally transfer an ink layer fed from a roll of ink ribbon to an indirect transfer film using a thermal head in a primary transfer unit, and then secondarily transfer it to a transfer target at a secondary transfer unit. In this type of indirect transfer method, even if the substrate on which the final image is to be transferred is different, such as paper or plastic, the image is printed on an indirect transfer film during primary transfer, so the target to be printed on remains the same. Since it is possible to form stable images, it has been put into practical use and used for various transfer targets.

On the other hand, an indirect transfer film for indirect transfer printer is conveyed back and forth many times in the printer, at the time of initialization by which the unused part of the film is detected for primary transfer, when the transfer start position of ink in each color is detected (also called "positioning" or "start position locating"), or when the indirect transfer film is conveyed to the transfer target for secondary transfer. At this time, the film is likely to become misalignment or wrinkled during winding due to misalignment conveyance or the like. In order to prevent such misalignment and wrinkles in winding, the printer is required to be assembled with a very high degree of accuracy. As a result, the degree of difficulty in manufacturing the printer is very high, which leads to a cause of cost increase.

As a conventional method for preventing misalignment during winding of a photographic-sensitized film or the like during conveyance, as illustrated in FIG. 6, a film 200 is provided with regular perforations 201 and is conveyed by a sprocket 202. Patent Literature 1 describes an example of application of such a method to a thermal transfer printer.

However, from a viewpoint of higher speed and improvement in printing sensitivity of an indirect transfer printer, the base material of an ink ribbon or an indirect transfer film is required to be as thin as possible, and in actuality, about several μm to several tens of μm thick. Thus, it is difficult to adopt a method by which to provide the perforations 201 in the base material and convey the film by the sprocket 202, due to occurrence of breakage and wrinkles of the base material.

Accordingly, conventional indirect transfer printers perform an initialization operation as illustrated in FIGS. 7A to 7C.

Referring to FIGS. 7A to 7C, reference sign 1 denotes a supply spool for an indirect transfer film 100, reference sign 4 denotes a winding spool for the indirect transfer film 100, reference sign 52 denotes a platen roller in a primary transfer unit, and reference sign 91 denotes a heated roller in a secondary transfer unit.

FIG. 7A illustrates a state in which an indirect transfer printer with the indirect transfer film 100 in use is powered on and starts an initialization operation. The indirect transfer film 100 in use has sensor marks m0, m1, m2, that serve as positioning marks for image transfer from an ink ribbon in the primary transfer unit, formed in corresponding image areas by printing or the like at the time of manufacture.

Used image areas have marks c0, c1, c2, c3, and c4 indicating the used state, recorded at the time of primary transfer.

In the initializing operation, as illustrated in FIG. 7B, it is necessary to, after the sensor mark m4 in the image area with the last mark c4 is detected by a sensor sn1, unwind the indirect transfer film 100 by 4.5 to 5 image areas in the forward direction, then check if a sufficient amount of the indirect transfer film 100 remains for the next recording, and then rewind the indirect transfer film 100 to locate the start position for the primary transfer.

In the initialization operation of a printer as described above, the indirect transfer film is conveyed back and forth for a long length in order to check the length of the unused part of the indirect transfer film. This makes the indirect transfer film likely to become skewed or wrinkled in winding, and the printer cannot be used in the meantime. Therefore, there is a demand for reducing this operation to suppress the occurrence of skew and wrinkling in winding and improve the work efficiency.

[Citation List] [Patent Literature] [PTL 1] JP 8-188307 A.

SUMMARY OF THE INVENTION

An issue to be solved by the present invention is to provide an indirect transfer printer and a conveyance method of an indirect transfer film that can decrease the amount of conveyance of the indirect transfer film that may cause skewed conveyance, to make skewed conveyance unlikely to occur, and reduce the initialization operation and improve the work efficiency.

In an aspect of the present invention to solve the above-described issue, an indirect transfer printer includes a primary transfer unit that primarily transfers an image from an ink ribbon to an indirect transfer film, a secondary transfer unit that secondarily transfers the image from the indirect transfer film to a recording medium, a primary transfer positioning sensor, and a processor. An initialization operation of the indirect transfer printer includes in sequence: detecting sensor marks transferred together with an image at a past primary transfer time by the primary transfer positioning sensor while the indirect transfer film is conveyed from a supply spool to a winding spool; determining by the processor whether the indirect transfer film has not been replaced before the initializing operation due to detection of the transferred sensor marks; if it is determined that the indirect transfer film has not been replaced, estimating by the processor a remaining amount of the indirect transfer film based on the ratio in rotation angle between the supply spool and the winding spool measured by a rotary encoder from start to end of the conveyance; if the unused amount is estimated to be equal to or greater than a remaining amount alert threshold, performing positioning of the primary transfer based on the last sensor mark among the sensor marks; if the unused amount is estimated to be less than the remaining amount alert threshold, conveying the indirect transfer film by image areas as a lead from the last sensor mark (the total of print image area(s) (two image areas for both-sided printing and one image area for single-side printing) and an image area as an error margin of rotation number of one wind (0.5 image areas or more and 2.5 image areas or less); and if an end mark indicating the final end of a usable region of the indirect transfer film is not detected by the primary transfer positioning sensor during the conveying, determining by the processor that the unused amount is greater than an amount necessary for recording on the next recording medium.

In particular, the processor may determine that the indirect transfer film has been replaced before power-on if the sensor marks transferred together with the image at the past primary transfer time are not detected while predetermined areas of the indirect transfer film are conveyed from the supply spool to the winding spool.

The indirect transfer printer further includes a first sensor that detects the sensor marks transferred together with the image at the past primary transfer time, and the primary transfer positioning sensor detects the last sensor mark.

Another aspect of the present invention to solve the above-described issue is a conveyance method of an indirect transfer film in an initializing operation that is performed at the time of power-on of an indirect transfer printer that primarily transfers an image from an ink ribbon to the indirect transfer film and secondarily transfers the image from the indirect transfer film to a recording medium. In this conveyance method, it is determined whether the indirect transfer film has not been replaced before the power-on if sensor marks transferred together with an image at a past primary transfer time are detected while the indirect transfer film is conveyed by predetermined image areas from a supply spool to a winding spool. If it is determined that the indirect transfer film has not been replaced, the unused amount of the indirect transfer film is estimated based on the ratio between the rotation angle of the supply spool and the rotation angle of the winding spool during conveyance. If the unused amount is estimated to be 2% that is a remaining amount alert threshold or more, the positioning of primary transfer is performed based on the last sensor mark among the sensor marks. If the unused amount is estimated to be less than 2% that is the remaining amount alert threshold, it is determined that the unused amount is greater than an amount necessary for recording on the next recording medium unless an end mark indicating the final end of a usable region of the indirect transfer film is detected while the indirect transfer film is conveyed by three image areas as a lead from the last sensor mark.

The remaining amount alert threshold is a threshold for the unused amount that needs to be checked by unwinding the film. The remaining amount alert threshold can be set within a range of 1% or more and 5% or less. The remaining amount alert threshold is preferably 2% in particular. The remaining amount alert threshold can be set in accordance with the length of the conveyance path and the thickness of the indirect transfer film. The image areas as a lead can be set to 0.5 image areas or more to 4.5 image areas. The image areas as a lead are preferably set so as to be longer than the length of the path to the transfer. If the unused amount is equal to or greater than the remaining amount alert threshold, the image areas as a lead can be set to 0.5 image areas from the second sensor (for primary transfer positioning). If the unused amount is equal to or greater than the remaining amount alert threshold, the image areas as a lead can be set to the total of the print image area(s) (two image areas for double-sided printing and one image area for single-sided printing) from the second sensor (for primary transfer positioning) and the error margin of rotation numbers corresponding to one winding. The error margin of rotation number of one winding can be set to be greater than 0.5 image areas and 2.5 image area or less.

According to the present invention, even if the indirect transfer film has no sensor marks for use at the time of primary transfer in the manufacturing phase, in the initialization operation that is performed before start of printing, during power-on of the indirect transfer printer, the presence or absence of sensor marks can be checked even with a small unwinding amount of the indirect transfer film. If the sensor marks are detected, it is determined that the indirect transfer film has not been replaced before the power-on, and if the unused amount is 2% that is the remaining amount alert threshold or more, the conveyance of the indirect transfer film for detecting the end mark that is the last sensor mark can be omitted. This makes it possible to reduce the risk of occurrence of defects due to skewed winding of the film. On the other hand, if the unused amount of the indirect transfer film is less than 2% that is the remaining amount alert threshold, it is possible to check if the amount is greater than the amount necessary for recording on the next recording medium.

DETAILED DESCRIPTION

Hereinafter, embodiments of the present invention will be described in detail with reference to the drawings. The present invention is not limited to the embodiments described below. In the following embodiments, technically preferable limitations for carrying out the invention are imposed, but these limitations are not essential requirements of the present invention.

Figure 1:
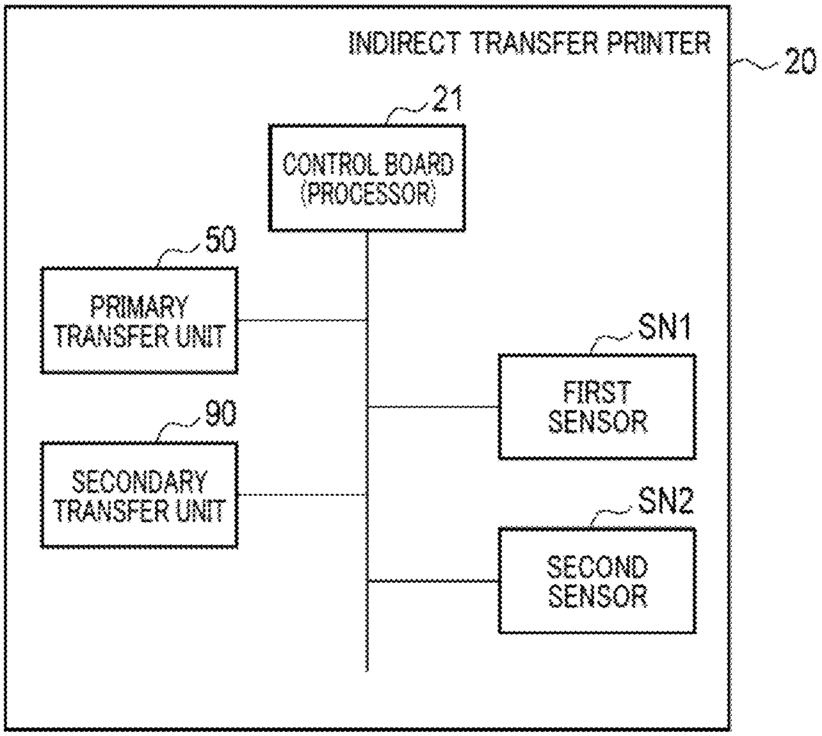
FIG. 1 is a functional block diagram illustrating a mode of an indirect transfer printer of the present invention.

FIG. 1 is a functional block diagram illustrating a mode of an indirect transfer printer of the present invention.

An indirect transfer printer 20 of the present invention includes a control board (processor) 21, a primary transfer unit 50, a secondary transfer unit 90, a first sensor (for secondary transfer positioning) SN1, and a second sensor (for primary transfer positioning) SN2. The control board (processor) 21 has, on a printed-wiring board, an arithmetic circuit including a processing chip and a control chip, memories such as a volatile memory and a non-volatile memory, an IO interface, and a bus.

The first sensor (for secondary transfer positioning) SN1 can be a photoelectric sensor. The second sensor (for primary transfer positioning) SN2 can be a photoelectric sensor. The photoelectric sensor can be of a transmissive type. The photoelectric sensor may be of a reflective type. The photoelectric sensor may be integrated with a light source. The light source of the photoelectric sensor can be an LED. The light source of the photoelectric sensor can be a laser diode. The photoelectric sensor may include a photodiode.

Figure 2:
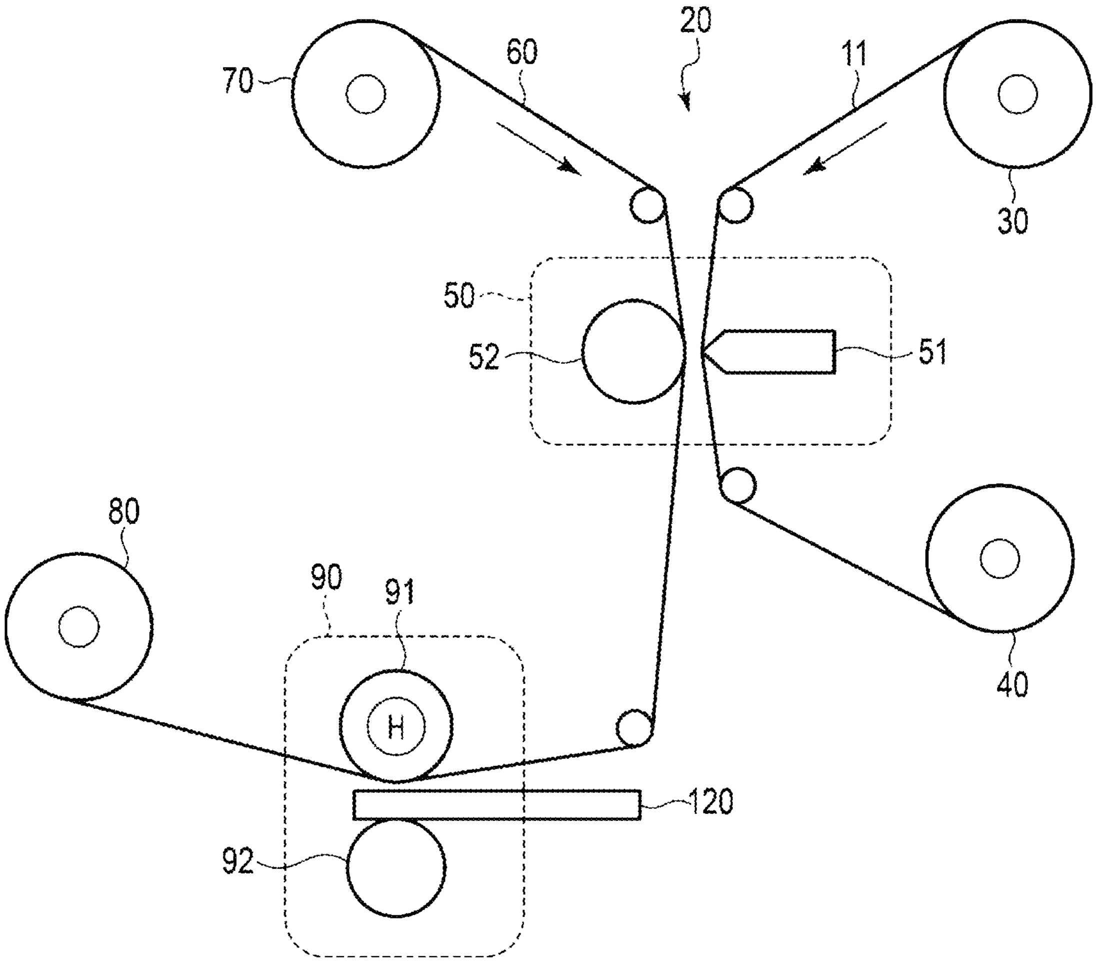
FIG. 2 is a schematic configuration diagram illustrating the mode of the indirect transfer printer of the present invention.

FIG. 2 is a schematic configuration diagram illustrating the mode of the indirect transfer printer of the present invention.

In the indirect transfer printer 20, an intermediate transfer medium 60 in a roll form is unwound from a feeding roll 70, and is wound on a winding roll 80 through the primary transfer unit 50 and the secondary transfer unit 90. On the other hand, a thermal transfer medium 11 in a roll form is unwound from a feeding roll 30, and is wound on a winding roll 40 through the primary transfer unit 50.

At the primary transfer unit 50, a transfer layer of the intermediate transfer medium 60 and a thermal transfer ink layer of the thermo-sensitive transfer medium 11 are sandwiched between a thermal head 51 and the platen roller 52 so as to face each other. The thermal head 51 and the platen roller 52 are separated from each other while the intermediate transfer medium 60 and the thermo-sensitive transfer medium 11 are simply conveyed. The thermal head 51 and the platen roller 52 are pressure-bonded to each other while transfer and recording are performed from the thermo-sensitive transfer medium 11 to the intermediate transfer medium 60, so that predetermined image information is transferred to the transfer layer of the intermediate transfer medium 60.

Then, at the secondary transfer unit 90, the transfer layer of the intermediate transfer medium 60 and a recording medium 120 are arranged so as to face each other. A heated roller 91 heated by a heater H thermally compresses and bonds the intermediate transfer medium 60 to the recording medium 120 pressed by a platen roller 92, so that the transfer layer of the intermediate transfer medium 60 is transferred to the recording medium 120 together with the image recorded at the primary transfer unit 50.

The recording medium 120 is contained in a stack not illustrated, and is conveyed by a conveyance device from the stack to the secondary transfer unit 90.

The control board (processor) 21 can control the operations of the supply spool 1, the winding spool 4, the primary transfer unit 50, the secondary transfer unit 90, and the conveyance device, based on the outputs from the sensors SN1, SN2, and others.

FIGS. 3A to 3E are explanatory diagrams illustrating the conveyance state of the indirect transfer film as a mode of the intermediate transfer medium of which remaining amount is 2% that is a remaining amount alert threshold or more.

As illustrated in FIGS. 3A to 3E, an indirect transfer film 10 that is a mode of the intermediate transfer medium 60 is conveyed from the supply spool 1 to the winding spool 4.

The supply spool 1 has the indirect transfer film 10 wound in a roll form thereon. The supply spool 1 includes a shaft (not illustrated) that rotatably supports the roll of the indirect transfer film 10. The supply spool 1 may further include a brake that adjusts the tension applied to the unwound heat-sensitive medium 11.

The winding spool 4 winds the indirect transfer film 10 unwound from the supply spool 1. The winding spool 4 includes a motor (not illustrated) for winding.

The winding spool 4 has a roll of the indirect transfer film 10 thereon. The indirect transfer film 10 may include a base material and an overlay layer provided on one main surface of the base material. The indirect transfer film 10 may not include the overlay layer. The winding spool 4 includes a shaft (not illustrated) that rotatably supports the roll of the indirect transfer film 10 and a motor (not illustrated) that rotates the shaft forward/backward. The winding spool 4 can unwind and rewind the indirect transfer film 10.

The indirect transfer printer 20 includes the primary transfer unit 50 and the secondary transfer unit 90 in the conveyance path of the indirect transfer film 10 from the supply spool 1 to the winding spool 4. The indirect transfer printer 20 further includes the thermal head 51 and the platen roller 52 at the primary transfer unit 50, and includes the heated roller 91 and the platen roller 92 at the secondary transfer unit 90.

As described with reference to FIG. 2, at the primary transfer unit 50, an image is primarily transferred from the thermal transfer medium 11 to the intermediate transfer medium 60, and at the secondary transfer unit 90, the image is secondarily transferred from the intermediate transfer medium 60 to the recording medium 120. Therefore, if the intermediate transfer medium 60 is the indirect transfer film 10 illustrated in FIGS. 3A to 3E, at the primary transfer unit 50, the thermal head 51 and the platen roller 52 are arranged so as to face each other with the thermo-sensitive transfer medium 11 and the intermediate transfer medium 60 in between. The thermal head 51 applies a thermal pressure to the thermo-sensitive transfer medium 11 to make a transfer of ink from the thermo-sensitive transfer medium 11 to the intermediate transfer medium 60. The intensity of laser light having passed through the thermo-sensitive transfer medium 11 or laser light having been reflected by the thermo-sensitive transfer medium 11 is detected by an optical sensor not illustrated. The output of the optical sensor can be used for positioning of the thermo-sensitive transfer medium 11 relative to the thermal head 51.

At the secondary transfer unit 90, the heated roller 91 and the platen roller 92 are arranged so as to face each other with the intermediate transfer medium 60 having been delivered from the primary transfer unit 50 and the recording medium 120 in between. The heated roller 91 applies a thermal pressure to the intermediate transfer medium 60 to make a transfer of the ink layer from the intermediate transfer medium 60 to the recording medium 120. If the intermediate transfer medium 60 includes an overlay layer, the heated roller 91 applies a thermal pressure to the intermediate transfer medium 60 to transfer a stack of the ink layer and the overlay layer from the intermediate transfer medium 60 to the recording medium 120.

Although not illustrated in FIG. 2, the first sensor (for secondary transfer positioning) SN1 for position detection of the intermediate transfer medium 60 during the secondary transfer is arranged in the vicinity of the heated roller 91 of the secondary transfer unit 90. In addition, the second sensor (for primary transfer positioning) SN2 for position detection of the intermediate transfer medium 60 during the primary transfer is arranged in the vicinity of the platen roller 52 of the primary transfer unit 50.

The indirect transfer printer 20 further includes a control unit not illustrated for control of the components of the indirect transfer printer 20, and data processing and control of image information and sensor information. In the illustrated arrangement, the first sensor (for secondary transfer positioning) SN1 and the second sensor (for primary transfer positioning) SN2 are provided at a position where the first sensor (for secondary transfer positioning) SN1 is separated by about 1.5 image areas from the standard standby position of the last sensor mark after the end of the printer operation. However, other than the illustrated arrangement, the positions of the first sensor (for secondary transfer positioning) SN1 and the second sensor (for primary transfer positioning) SN2 may be set in accordance with the arrangements of the primary transfer unit 50 and the secondary transfer unit 90, the size of the image area to be recorded, and others. The standard standby position of the last sensor mark after the end of the printer operation of the indirect transfer printer will be described later.

The intermediate transfer medium 60 is capable of being conveyed in a forward direction from the feeding roll 70 to the winding roll 80 for color overlaying at the time of primary transfer and positioning at the primary transfer unit 50 and the secondary transfer unit 90, and is also capable of being conveyed in the backward direction. That is, the intermediate transfer medium 60 is capable of reciprocating conveyance in the forward direction and the backward direction. The feeding roll 70 and the winding roll 80 can be coupled to a motor (not illustrated) for forward and backward rotational driving. The motor can be a stepping motor. The motor may be an AC motor or a DC motor. Any other publicly known motor can be coupled. The motor may be directly coupled to the feeding roll 70 and the winding roll 80 or may be coupled via a gear to the feeding roll 70 and the winding roll 80. The motor may be electrically driven by a motor driver, and the motor driver may be an inverter.

Referring back to FIGS. 3A-3E, in general, in the unused state of the indirect transfer film 10 in which the ink ribbon is not transferred at all, the sensor marks on the indirect transfer film 10 are the beginning mark with which the beginning of the usable region can be optically detected and the end mark with which the end of the usable region can be detected. In other words, no other sensor marks are provided between the beginning mark and the end mark.

Figures 3A, 3B, 3C, 3D, 3E:
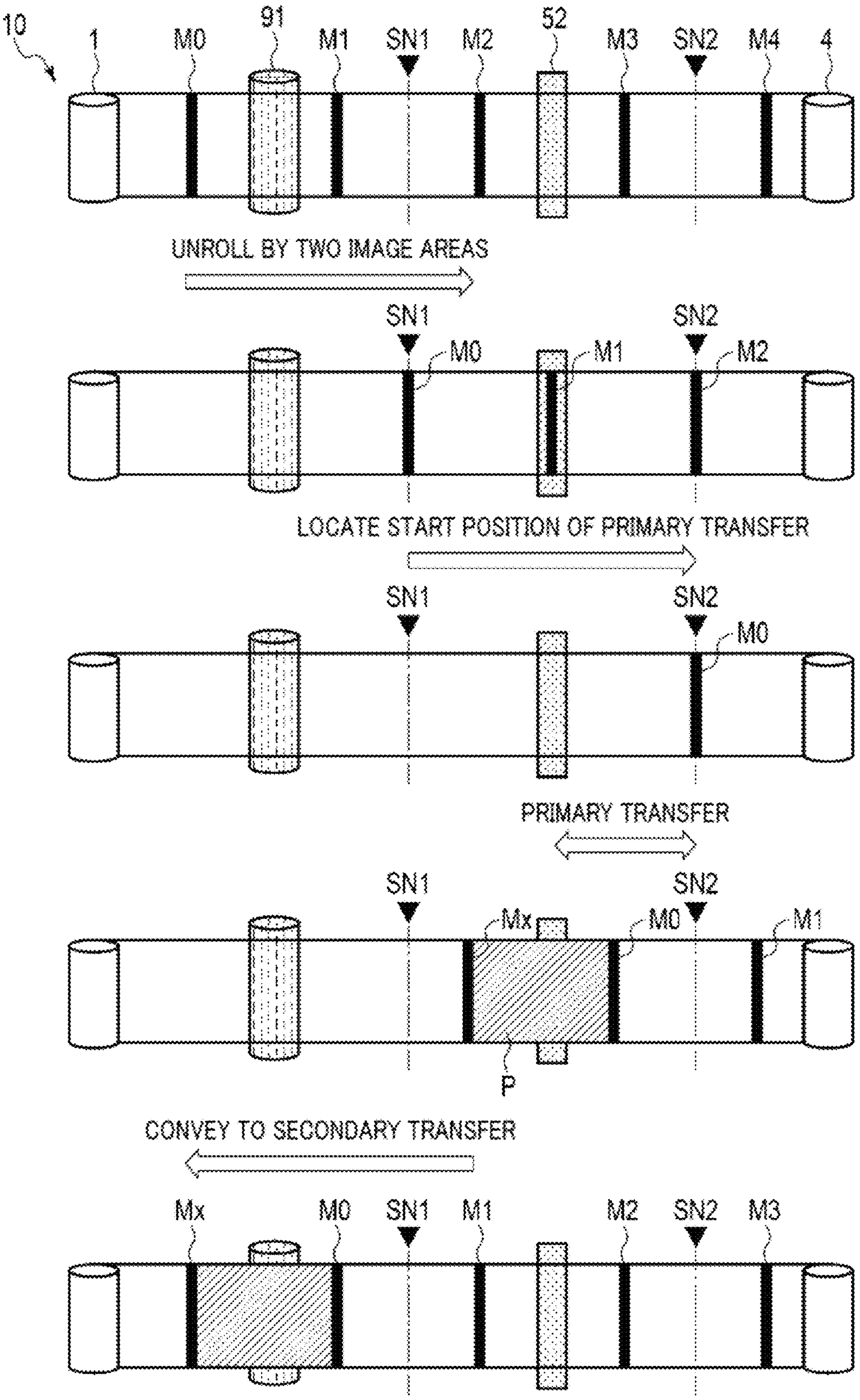
FIGS. 3A to 3E are explanatory diagrams illustrating the conveyance state of the indirect transfer film as a mode of an intermediate transfer medium of which a remaining amount is 2% that is a remaining amount alert threshold or more.

On the other hand, during the transfer process, the indirect transfer film 10 has the sensor marks to be positioning marks in transferring an image from the ink ribbon at the primary transfer unit 50 for corresponding image areas. Although the image is transferred to the recording medium 120 together with the transfer layer at the secondary transfer unit 90, the sensor marks are not transferred but are left in the used region of the indirect transfer film 10. FIG. 3A illustrates start of the initializing operation with the indirect transfer film 10 in use mounted as described above. The initialization operation can be an operation before the start of the transfer. The initializing operation is performed at the time of power-on, at the time of recovery from the standby state, at the time of recovery from the sleep state, and at other times.

At this time, the indirect transfer film 10 has sensor marks M left on the used image areas, such as M0, M1, M2, M3, M4, . . . . Each sensor mark M is formed at the front end portion or rear end portion of the corresponding image area as viewed in the forward direction, at a predetermined place not overlapping the image to be secondarily transferred. In the present embodiment, the sensor marks M are formed at the rear end portions as an example.

In the initializing operation, first, as illustrated in FIG. 3B, the sensor marks M are detected by the first sensor (for secondary transfer positioning) SN1 while the indirect transfer film 10 is unrolled and conveyed in the forward direction by a predetermined number of image areas. With the arrangements of the heated roller 91 of the secondary transfer unit 90 and the sensor SN1, the sensor marks M can be detected by unrolling the indirect transfer film 10 by two image areas. Different number of image areas may be preset in accordance with the arrangements of the heated roller 91 of the secondary transfer unit 90 and the first sensor (for secondary transfer positioning) SN1, in particular, in accordance with the span of these arrangements. As a result, the sensor marks M0 and M1 are detected. Upon detection of the sensor marks M by the first sensor (for secondary transfer positioning) SN1, the control board (processor) 21 determines that the indirect transfer film 10 has not been replaced since the previous printer activation time.

At the same time, the control board (processor) 21 detects the rotation speed of the supply spool 1 and the rotation angle of the winding spool 4, and estimates, from the ratio between the rotation speed and the rotation angle, the unused amount of the indirect transfer film 10 that is left on the supply spool 1. When the used amount of the indirect transfer film 10 is small, the diameter of the indirect transfer film 10 on the supply spool 1 is large and the diameter of the indirect transfer film 10 on the winding spool 4 is small. Thus, the rotation angle of the supply spool 1 is less than the rotation angle of the winding spool 4 when a predetermined length of the indirect transfer film 10 is conveyed. As the use of the indirect transfer film 10 progresses, the diameter of the indirect transfer film 10 on the supply spool 1 gradually becomes smaller, and the rotation angle of the supply spool 1 gradually becomes greater. When the indirect transfer film 10 is used to close to the end, the diameter of the indirect transfer film 10 on the winding spool 4 becomes large. Accordingly, the rotation angle of the supply spool 1 becomes even larger, and conversely, the rotation angle of the winding spool 4 becomes even smaller. Therefore, it is possible to estimate the unused amount of the indirect transfer film 10 left on the supply spool 1 by detecting the rotation speed of the supply spool 1 and the rotation angle of the winding spool 4 and determining the ratio between the rotation speed and the rotation angle. The rotation angle of the spool can be detected by adopting a publicly known rotary encoder or the like as appropriate. The rotary encoder can be of an incremental type or an absolute type. The rotation angle can be detected from the ratio between the rotation angle of the winding spool and the rotation angle of the supply spool during the movement at the transfer of one image area, for example.

If it is determined that the estimated remaining unused amount of the indirect transfer film 10 on the supply spool 1 is 2% of the initial unused amount of the indirect transfer film 10 on the spool, which is the remaining amount alert threshold, or more, it is considered that a sufficient amount of the indirect transfer film 10 is left at least for the primary transfer and secondary transfer of the next image area, even taking estimation error into account. Thus, the control board (processor) 21 omits winding of the indirect transfer film 10 for checking the remaining amount of the indirect transfer film 10, and controls the indirect transfer film 10 to be conveyed until the last sensor mark M0 reaches the second sensor (for primary transfer positioning) SN2 for locating the start position of the primary transfer as illustrated in FIG. 3C. During the operation of locating the start position, the sensor mark M0 is moved to the position where the unused area of the indirect transfer film 10 is not affected by the remaining heat of the heated roller 91. The position where the unused area of the indirect transfer film 10 is not affected by the remaining heat of the heated roller 91 is in the vicinity of the outlet of the supply spool 1, for example.

Since the indirect transfer film 10 is generally wound in many cases so as to treat around to be able to process 300 to 500 sheets of the recording medium 120, 2% of this corresponds to 6 to 10 sheets. Thus, it can be determined that a sufficient amount of the indirect transfer film 10 is left in the unused state even with an estimation error.

Figures 4A, 4B, 4C, 4D, 4E:
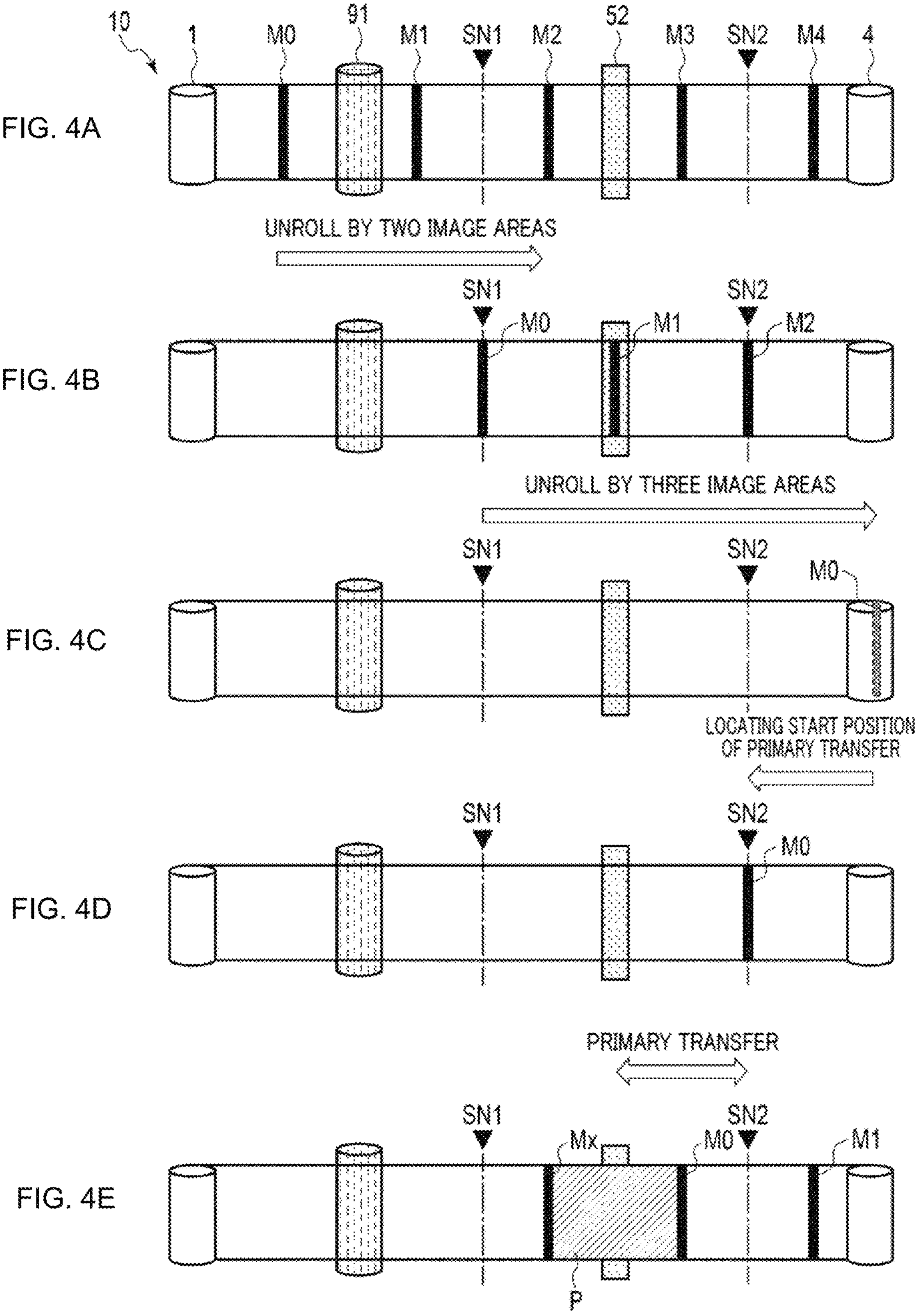
FIGS. 4A to 4E are explanatory diagrams illustrating the state of conveyance of the indirect transfer film of which a remaining amount is less than 2% that is the remaining amount alert threshold.

As illustrated in FIG. 4D, the image is primarily transferred to an image area P next to the sensor mark M0, and a new sensor mark Mx is transferred to the end of the image area P. Then, the indirect transfer film 10 is conveyed to the secondary transfer unit 90 for the secondary transfer as illustrated in FIG. 4E, and the image is transferred to the recording medium 120 by the heated roller 91. At this time, the first sensor (for secondary transfer positioning) SN1 can also be used for locating the start position for secondary transfer positioning.

After the end of the secondary transfer, the control board (processor) 21 stops the indirect transfer film 10 at a position where the sensor mark Mx that is the last sensor mark is closer to the supply spool 1 than to the first sensor (for secondary transfer positioning) SN1 and the heated roller 91. This makes it possible to prevent the unused part of the indirect transfer film 10 from getting damaged by heat from the heated roller 91. The sensor mark Mx is used as the last sensor mark at the transfer of the next image area.

Therefore, when the use of the indirect transfer printer 20 is ended in this state, the position of the indirect transfer film 10 at that time is a standard standby position for the start of the next initialization operation unless the indirect transfer film 10 is replaced before the next use time of the printer. Accordingly, the control board (processor) 21 can detect the sensor mark Mx by conveying the indirect transfer film 10 by two image areas in the forward direction at the next use time of the printer, and determine that the indirect transfer film 10 has not been replaced.

As stated above, the indirect transfer printer 20 of the present invention does not require printing of sensor marks on the indirect transfer film 10 for each image area at the time of manufacture, which eliminates the need for a manufacture process of printing sensor marks and is advantageous in terms of cost.

The process in the case where it is determined that the indirect transfer film 10 has been replaced since the previous printer operation time can be a different process because the arrangement of the indirect transfer film 10 is different from the standard arrangement as described above. For example, the indirect transfer film 10 may be conveyed in the opposite direction and rewound, and the beginning mark or the wound sensor mark may be detected. However, there is no particular limitation on the process.

On the other hand, if the control board (processor) 21 determines that the estimated unused amount of the indirect transfer film 10 is less than 2% of the initial amount of the indirect transfer film 10, which is the remaining amount alert threshold, there is a possibility that an insufficient amount of indirect transfer film 10 will remain, taking estimation error into account. Thus, the control board (processor) 21 actually unrolls the remaining indirect transfer film 10 by the length necessary for recording to check the remaining amount.

FIGS. 4A and 4B illustrate the state of entry into the initializing operation as in the above-described case. As described above, the control board (processor) 21 estimates the unused amount of the indirect transfer film 10 left on the supply spool 1, based on the ratio between the rotation speed of the supply spool 1 and the rotation angle of the winding spool 4. If the control board (processor) 21 determines that the estimated unused amount of the indirect transfer film 10 is less than 2% of the initial amount, the control board (processor) 21 controls the indirect transfer film 10 to be unrolled by three image areas as illustrated in FIG. 4C and checks if the amount of the indirect transfer film 10 to be actually used is left. The three image areas are determined in consideration of image areas for the front side and back side of the recording medium 120 and one image area as a margin.

If the control board (processor) 21 confirms that the amount of three image areas remains, the control board (processor) 21 controls the indirect transfer film 10 to be conveyed in the opposite direction until the sensor mark M0 reaches the second sensor (for primary transfer positioning) SN2 to locate the start position for the primary transfer as illustrated in FIG. 4D. Then, as illustrated in FIG. 4E, the control board (processor) 21 performs the primary transfer of the image to the image area P next to the sensor mark M0, and transfers the new sensor mark Mx to the end of the image area P. Subsequent operations are the same as those described above and thus description thereof will be omitted. In the operation of locating the start position, the sensor mark M0 is moved to a position where the unused area of the indirect transfer film 10 is not affected by the remaining heat of the heated roller 91. The position where the unused area of the indirect transfer film 10 is not affected by the remaining heat of the heated roller 91 is the vicinity of the outlet of the supply spool 1, for example.

In the state where the remaining amount of the indirect transfer film 10 is reduced to about less than 2%, the indirect transfer film 10 is unlikely to become skewed and wrinkled in winding. If the indirect transfer film 10 becomes skewed and wrinkled in winding, the influence of these phenomena is limited. Thus, if the film unrolling operation is performed as described above, there is little substantial influence.

As described above, if the remaining amount of the indirect transfer film 10 at the time of initialization is 2% or more, unrolling and rewinding the indirect transfer film 10 for checking the remaining amount of the indirect transfer film 10 can be omitted. Accordingly, it is possible to suppress the occurrence of skew and wrinkles in winding that are likely to occur during the conveyance by the heated roller 91 of the secondary transfer unit 90 and the conveyance by the platen roller 52 of the primary transfer unit 50. At the same time, it is possible to save the time required for unrolling and rewinding the indirect transfer film 10. If the remaining amount is less than 2%, the indirect transfer film 10 is unrolled and checked for the necessary amount, so that the indirect transfer film 10 will not become lacking during the recording.

Figure 5:
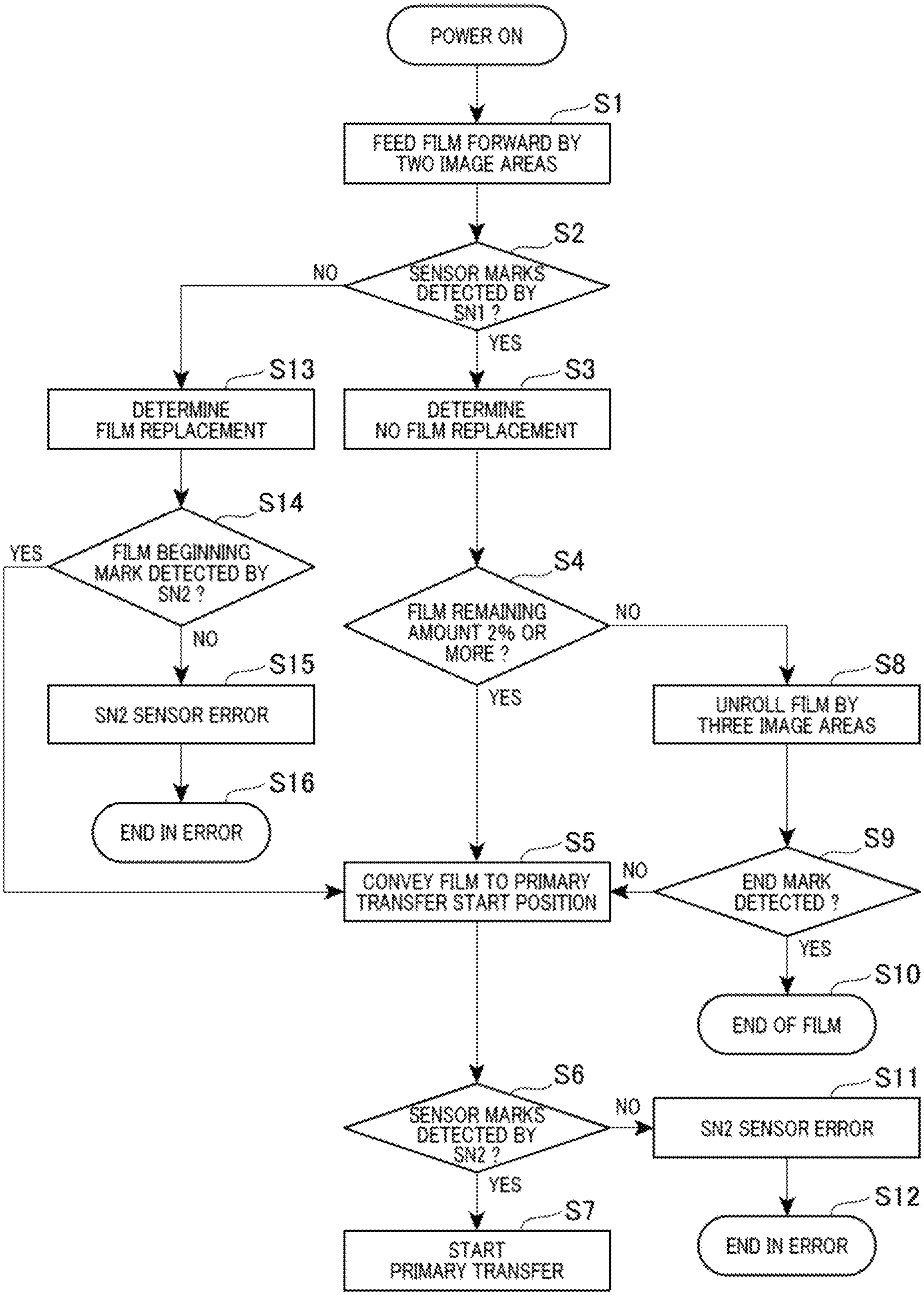
FIG. 5 is a flowchart showing an example of an initialization operation in the indirect transfer printer of the present invention.
Figure 6:
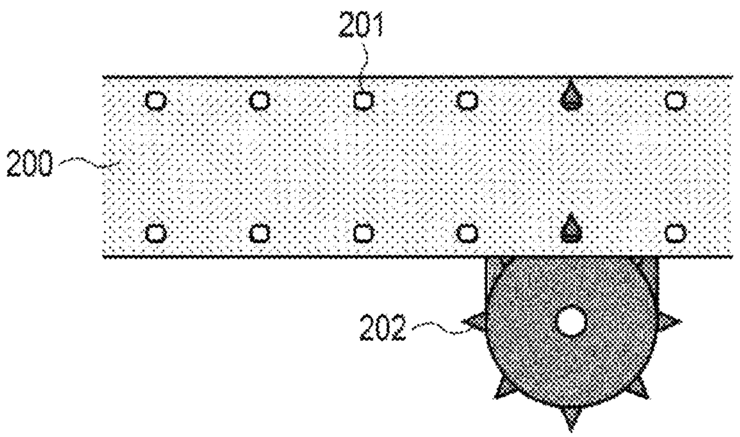
FIG. 6 is a diagram illustrating an example of a conventional conveyance method using a sprocket.
Figure 7A:
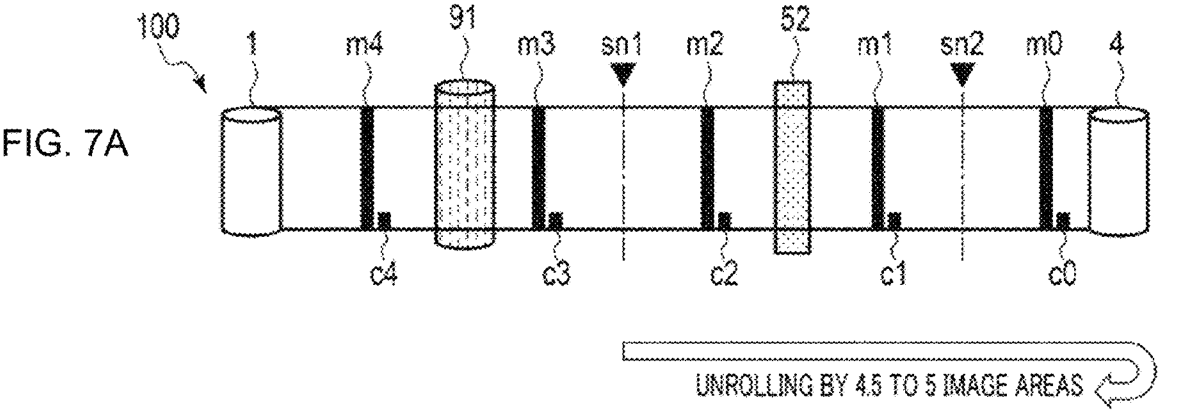
FIGS. 7A to 7C are diagrams illustrating an example of an initializing operation in a conventional indirect transfer printer.
Figure 7B:
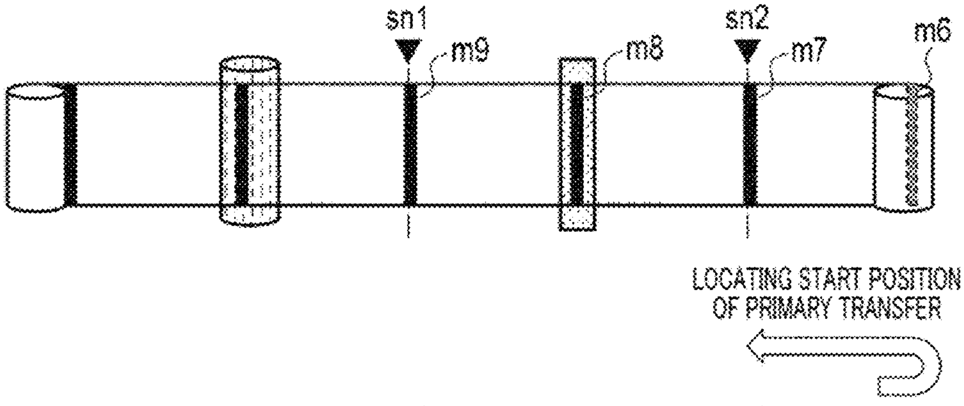
Figure 7C:
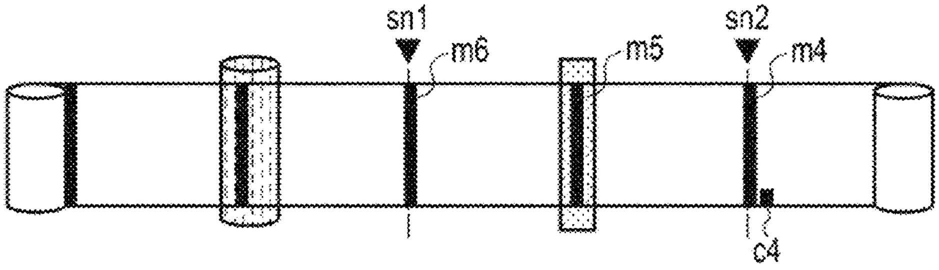

FIG. 5 is a flowchart showing an example of initializing operation in the indirect transfer printer of the present invention.

First, steps S0 to S7 that are main parts of the initializing operation will be described.

In the main parts of the initializing operation, when the indirect transfer printer 20 is powered on, the initializing operation is started (S0), and the indirect transfer film 10 is conveyed by two image areas (S1).

In response to this, if the sensor marks M are detected by the first sensor (for secondary transfer positioning) (Yes in S2), the process proceeds to step S3, and if the sensor marks M are not detected (No in S2), the process proceeds to step S13.

In step S3, the control board (processor) 21 determines that the indirect transfer film 10 has not been replaced before power-on (S3). After that, the control board (processor) 21 estimates the unused amount of the indirect transfer film 10 left on the supply spool 1, from the ratio between the rotation angle of the supply spool 1 and the rotation angle of the winding spool 4 (S4).

As a result of the estimation, if the unused amount of the indirect transfer film 10 is 2% that is the remaining amount alert threshold or more (Yes in S4), the process proceeds to step S5, and if the unused amount of the indirect transfer film 10 is less than 2% that is the remaining amount alert threshold (No in S4), the process proceeds to step S8.

In step S5, the control board (processor) 21 controls the indirect transfer film 10 to be conveyed to the primary transfer start position (S5). After that, if the second sensor (for primary transfer positioning) SN2 detects the last sensor mark M on the indirect transfer film 10 (Yes in S6), the control board (processor) 21 performs control for locating the primary transfer start position, and the primary transfer unit 50 starts the transfer (S7).

Next, steps S8 to S10 that are performed in the case where the film remaining amount is determined as being less than 2% will be described.

In step S8, the control board (processor) 21 controls the indirect transfer film 10 to be unrolled by three image areas (S8). In response to this, if the second sensor (for primary transfer positioning) SN2 detects the end mark (Yes in S9), the control board (processor) 21 determines that the indirect transfer film 10 has been completely used, and the operation is ended (S10).

On the other hand, in step S9, if the end mark is not detected (No in S9), the process proceeds to step S5.

Next, steps S11 and S12 that are performed in the event of an error in the second sensor (for primary transfer positioning) SN2 will be described.

In step S11, the control board (processor) 21 determines that an error has occurred in the second sensor (for primary transfer positioning) SN2 (S11), and the operation is ended (S12).

Finally, steps S13 to S16 that are performed in the case where the indirect transfer film 10 has been replaced before power-on will be described.

In step S13, the control board (processor) 21 determines that the indirect transfer film 10 has been replaced before power-on (S13). After that, the control board (processor) 21 controls the indirect transfer film 10 to be rewound. In response to this, if the second sensor (for primary transfer positioning) SN2 detects the beginning mark or the sensor mark indicating the start of the usable region of the indirect transfer film 10 (Yes in S14), the process proceeds to step S5.

On the other hand, in step S14, if the second sensor (for primary transfer positioning) SN2 does not detect the beginning mark or the sensor mark indicating the beginning end of the usable region of the indirect transfer film 10 (No in S14), the control board (processor) 21 determines that there is an error in the second sensor (for primary transfer positioning) SN2 (S15), and the operation is ended (S16).

As described above, according to the present invention, even if the indirect transfer film 10 has no sensor marks for use at the time of primary transfer in the manufacture phase, the presence or absence of the sensor marks M can be verified at power-on of the indirect transfer printer 20 in the initializing operation that is performed prior to the start of printing, even with a small unrolled amount of the indirect transfer film 10. If the sensor marks M are detected, it is determined that the indirect transfer film 10 has not been replaced before the power-on, and if the unused amount is equal to or greater than the remaining amount alert threshold (for example, 2%), the conveyance of the indirect transfer film 10 for detecting the end mark that is the last sensor mark can be omitted. This makes it possible to reduce the risk of defects due to skewed winding of the film. On the other hand, if the unused amount of the indirect transfer film 10 is less than the remaining amount alert threshold (for example, 2%), it is possible to check if the remaining amount is greater than the amount necessary for recording on the next recording medium 120.

The invention of the present application is not limited to the above-described embodiments and can be modified in various manners in the implementation phase without departing from the gist of the present invention. The embodiments can be performed in combination as appropriate wherever possible, and in that case, the advantageous effects of the combination can be obtained. Further, the above-described embodiments include the inventions in various phases, and various inventions can be extracted by appropriate combinations of the plurality of disclosed configuration requirements.

[Reference Signs List] 1 . . . Supply spool; 4 . . . Winding spool; 10 . . . Indirect transfer film; 11 . . . Thermal transfer medium; 20 . . . Indirect transfer printer; 21 . . . Control board (processor); 30 . . . Feeding roll; 40 . . . Winding roll; 50 . . . Primary transfer unit; 51 . . . Thermal head; 52 . . . Platen roller; 60 . . . Intermediate transfer medium; 70 . . . Feeding roll; 80 . . . Winding roll; 90 . . . Secondary transfer unit; 91 . . . Heated roller; 92 . . . Platen roller; 100 . . . Indirect transfer film; 120 . . . Recording medium; 200 . . . Film; 201 . . . Perforation; 202 . . . Sprocket; SN1 . . . First sensor (for secondary transfer positioning); SN2 . . . Second sensor (for primary transfer positioning); sn1 . . . First sensor (for secondary transfer positioning); sn2 . . . Second sensor (for primary transfer positioning); c (c0, c1, c2, c3, c4) . . . Mark; H . . . Heater; M (M0, M1, M2, M3, M4) . . . Sensor mark; m (m0, m1, m2, m3, m4, m5, m6, m7, m8, m9) . . . Sensor mark.

What is claimed is:

1. An indirect transfer printer, comprising:

a primary transfer unit that primarily transfers an image from an ink ribbon to an indirect transfer film;

a secondary transfer unit that secondarily transfers the image from the indirect transfer film to a recording medium;

a primary transfer positioning sensor; and a processor, wherein an initializing operation of the indirect transfer printer includes in sequence:

detecting sensor marks transferred together with an image at a past primary transfer time by the primary transfer positioning sensor while the indirect transfer film is conveyed from a supply spool to a winding spool;

determining by the processor that the indirect transfer film has not been replaced before the initializing operation due to detection of the transferred sensor marks;

if it is determined that the indirect transfer film has not been replaced, estimating by the processor a remaining amount of the indirect transfer film based on a ratio in rotation angle between the supply spool and the winding spool measured by a rotary encoder from start to end of the conveyance;

if an unused amount is estimated to be equal to or greater than a remaining amount alert threshold, performing positioning of the primary transfer based on a last sensor mark among the sensor marks;

if the unused amount is estimated to be less than the remaining amount alert threshold, conveying the indirect transfer film by an image area as a lead from the last sensor mark and an image area as an error margin of rotation number of one wind; and if an end mark indicating a final end of a usable region of the indirect transfer film is not detected by the primary transfer positioning sensor during the conveying, determining by the processor that the unused amount is greater than an amount necessary for recording on a next recording medium.

2. The indirect transfer printer of claim 1, wherein the processor determines that the indirect transfer film has been replaced before power-on if the sensor marks transferred together with the image at the past primary transfer time are not detected while the indirect transfer film is conveyed by predetermined image areas from the supply spool to the winding spool.

3. The indirect transfer printer of claim 1, further comprising a first sensor that detects the sensor marks transferred together with the image at the past primary transfer time, wherein the primary transfer positioning sensor detects the last sensor mark.

4. The indirect transfer printer of claim 2, wherein the predetermined image areas are three image areas.

5. A conveyance method of an indirect transfer film in an initialization operation that is performed at a time of power-on of an indirect transfer printer that primarily transfers an image from an ink ribbon to the indirect transfer film and secondarily transfers the image from the indirect transfer film to a recording medium, the conveyance method comprising the steps of:

determining that the indirect transfer film has not been replaced before the power-on if sensor marks transferred together with an image at a past primary transfer time are detected while the indirect transfer film is conveyed by predetermined image areas from a supply spool to a winding spool;

if it is determined that the indirect transfer film has not been replaced, estimating an unused amount of the indirect transfer film based on a ratio between a rotation angle of the supply spool and a rotation angle of the winding spool during the conveyance;

if the unused amount is estimated to be 2% that is a remaining amount alert threshold or more, performing positioning of the primary transfer based on a last sensor mark among the sensor marks; and if the unused amount is estimated to be less than 2% that is the remaining amount alert threshold, determining that the unused amount is greater than an amount necessary for recording on a next recording medium unless an end mark indicating the final end of a usable region of the indirect transfer film is detected while the indirect transfer film is conveyed by three image areas as a lead from the last sensor mark.

* * * * *